3,640,921
FILAMENTARY POLYOLEFIN FOAM PRODUCT
AND PROCESS OF MAKING THE SAME
Hans Eberle, Limburgerhof, and Gerhard Wuttke, Neu-
hofen, Germany, assignors to Grunzweig & Hartmann
Aktiengesellschaft, Ludwigshafen (Rhine), Germany
No Drawing. Continuation-in-part of application Ser. No.
793,914, Jan. 24, 1969. This application Aug. 1, 1969,
Ser. No. 847,536
Claims priority, application Germany, Jan. 27, 1968,
P 16 94 357.0; Aug. 3, 1968, P 17 69 909.1
Int. Cl. C08f 29/12, 47/10; B29d 27/00
U.S. Cl. 260—2.5 E                    18 Claims

ABSTRACT OF THE DISCLOSURE

A filamentary product consists of a foamed polypropylene comprising (a) a major portion of a stereoregular propylene polymerizate having a relatively high molecular weight and (b) a minor portion of a heptane-soluble polymerizate of relatively low molecular weight.

The product is made by foaming and extruding a mixture of propylene polymers having a molecular weight above 600,000 and a liquid hydrocarbon having from 5 to 10 carbon atoms at a temperature between 170 and 220° C. whereupon the extruded body is immediately subjected to stretching without intermediate heating or compressing.

CROSS-REFERENCES TO RELATED APPLICATIONS

This application is a continuation-in-part of the application Ser. No. 793,914 filed on Jan. 24, 1969 by the same inventors of "Foam-forming Polypropylene Composition."

BACKGROUND OF THE INVENTION

The invention relates to a slender elongated product which generally has filamentary shape and may be a monofilament, a thread, a strand, a ribbon, a cord or a rod, etc., and consists of foamed stereoregular polyolefin.

Filamentary or strand-shaped products have already been formed from various foamed plastics, including foamed polyolefins. The French patent 1,490,987 furthermore discloses a method of making monofilaments from specific stereoregular polypropylenes. This process requires that the products, after their manufacture, must again be heated to a higher temperature and must be condensed to at least one half of their original thickness before they can be subjected to a stretching operation. If this densification is omitted, the filaments are subject to breaking or tearing during the subsequent stretching process. During the densification, the cell walls of the material will undergo at least partial bursting. The process therefore is cumbersome and the products are comparatively fragile.

The stereoregular polypropylene of this process have a mean molecular weight of between 200,000 and 600,000 and are manufactured by means of Zeigler-Natta-catalysts in organic liquids or by the Philipps process (British Pat. 927,582) by using chromic oxide catalyst applied on a silica support and likewise disposed in organic liquids.

By virtue of this kind of manufacture in organic liquids, the products contain only high-molecular stereoregular fractions within the stated limits of the main molecular weight since the lower-molecular-weight fractions remain in solution in the organic liquids when the polymerizate is recovered by filtering off the pulverulent stereoregular portions. These steroeregular polyolefins are highly expensive because of their method of manufacture. It is also necessary, with this process, to destroy residual catalysts by acids or other means and to remove these residues carefully because particularly the acid catalyst residues will cause corrosion of machine elements upon subsequent use of the polyolefins and are also believed to be responsible for the lack of stability of the final products.

The use of foamed stereoregular polypropylene has therefore been abandoned again in so far as large-scale industrial manufacture is concerned. The ribbon and monofilament manufacture according to the cited French patent has not found general acceptance.

However, propylene, because of its low weight and its excellent electrical properties, is a valuable raw material and there is a genuine desire to have an inexpensive filamentary or strand-shaped product on the basis of foamed polypropylene and to provide for an industrially useful process for making such product.

This therefore is the object of the present invention.

SUMMARY OF THE INVENTION

A filamentary or strand-shaped polyolefin foam product comprises a major portion of a stereoregular polymerizate having a relatively high molecular weight and a minor portion of a heptane-soluble propylene polymerizate of relatively low molecular weight.

The invention also embraces a process for making the product comprising foaming and extruding a mixture of propylene polymerizate having a molecular weight above 600,000 and, as foaming agent, a liquid hydrocarbon having 5 to 10 carbon atoms at a temperature between 170 and 220° C. followed by subjecting the extruded body to stretching without intermediate heating or compressing.

DESCRIPTION OF THE PREFERRED EMBODIMENTS

The comparatively very high molecular weight stereoregular propylene employed in the product of the invention may be a homo-, co-, or graft polymerizate, or a mixture of these three types of polymerizates. The minor portion present in the product of heptane-soluble low molecular propylene may again be in the form of a homo-, co- or graft polymerizate, or a mixture of these types of polymerizates. There may also be present a low molecular or heptane-soluble polymer of another olefin or other monomer which is compatible with the other components of the product. The entire combination of polymers will be designated propylene polymerizate in the following discussion.

It is preferred to employ a propylene polymerizate that has been formed in well known manner of polymerization in the gaseous phase and which may still contain residual catalyst.

A particularly preferred propylene polymerizate comprises about 5–35% by weight and, still more preferably, between 10 and 15% by weight of heptane-soluble low molecular isotactic and atactic fractions with a mean molecular weight of between about 10,000 and 100,000, together with between 95 and 65% by weight, and preferably between 90 and 85% by weight of a stereoregular propylene polymerizate of a very high molecular weight and a broad range distribution of individual molecular weights.

This last-mentioned component of high molecular weight thus may be composed of between 10 and 30% by weight, and preferably of about 20% by weight, of polymers with a mean molecular weight of less than 230,000 and furthermore between about 30 and 50% by weight, preferably about 40% by weight, of polymers with a mean molecular weight between about 230,000 and 1,150,000 and additionally between about 30 and 50% by weight, and preferably about 40% by weight, of polymers having a mean molecular weight above 1,150,000.

The fraction just listed as the last component, that is the polypropylenes with a molecular weight above 1,150,000, should preferably contain up to about 5% by weight of polymers with a molecular weight above 3,000,000.

The propylene polymerizate accordingly is distinguished particularly by its very high mean molecular weight from conventional polypropylenes in which the molecular weight is below 600,000. As distinguished, the foamed stereoregular propylene polymerizate of the ribbons, filaments, strands, etc., of the invention has a mean molecular weight between about 700,000 and 1,200,000. The reduced viscosity, measured in dekalin at 135° C. (c.=0.1%, stabilized with 0.2 N-phenyl-$\beta$-naphthylamine), is between $\eta$ red.=5 and $\eta$ red.=9.

Prior to foaming, the propylene polymerizate had the following structural parameter:

(a) Numerical mean of the molecuar weight: $\overline{M}n$ calculated as 125,000.

(b) Weight mean of the molecular weight: $\overline{M}w$ calculated as 1,151,000.

(c) Molecular weight distribution ($\overline{M}w/\overline{M}n-1$)=8.2.

The density of the raw product, that is, the product that has not yet been foamed and has not been reacted with a hydrocarbon foaming agent, is always below 0.90; the isotactic index is at 90%.

Filamentary or strand-shaped products of the composition of the invention do not have the fragility or brittleness of the prior-art filaments made of foamed polypropylene. They can easily be used for various purposes, such as intertwining, weaving, knitting, tying, plating, braiding, etc. It is also possible to weld the products by application of pressure and/or temperature and to provide them with facings of other materials such as paper, textiles, foils, etc.

The filamentary or strand-shaped products of the invention can be formed through an extruder without any substantial thermal degradation during the operation. For this purpose, the following process is particularly preferred.

The process involves mixing the propylene polymerizate and the liquid hydrocarbon used as foaming agent which should have between 5 and 10 carbon atoms and, if desired, adding nucleating agents for the bubbles to be formed and other conventional additives and subjecting the mixture to elevated temperatures. The propylene polymerizate used in this mixture should have a mean molecular weight above 600,000 and the temperature applied should be between 170 and 220° C. The foaming is effected in the extruder. In this type of process, substantially no thermal degradation of the polypropylene takes place in spite of its sensitivity to heat and in spite of the use of heat stabilizers.

The mechanical properties of the products of the invention are excellent because of the high molecular weight. As is well known, the properties of plastics such as tensile strength, plasticity, elasticity, viscosity, etc., depend on the magnitude of the molecular weight. The conventional filaments and strands, etc., made of foamed polyolefins always have molecular weights below 600,000 because of the thermal degradation during the processing.

The products of the invention accordingly have a fine cell structure, are supple and elastic, and do not have the paraffin- or wax-type hand which is common in the prior-art foamed polyolefins. They also have an excellent heat, cold, and solubility resistance.

The filaments or strands which leave the extruder can immediately be subjected to stretching. It is not necessary to reheat or compress the products prior to stretching, such as was necessary with the prior-art procedures, for instance as described in the French Pat. 1,490,987. The preferred stretching ratio is between about 1:2 and 1:16.

It is preferred to use a stereoregular homopolymer or copolymers of propylene with another olefin or suitable vinyl derivative. There may also be used graft polymers on the basis of polypropylene and mechanical mixtures of the several components. It is however essential that the foamed mass always include a low molecular polymer which serves as the solution promoter for the foaming agent. These low molecular polymers preferably are also either homopolymers of the propylene or copolymers or graft polymers with other suitable monomers or mechanical mixtures of the several components.

If the components are mechanically mixed, it is necessary to obtain a homogeneous distribution of the individual components in the mass. Preferred, however, is a propylene polymerizate mixture which contains the different components already during the process of its formation. These conditions are in particular met with propylene polymerizates which have been obtained by gas-phase polymerization of propylene.

Surprisingly, particularly good results are obtained by empolying a gas-phase polymerizate which has not been subjected to special purification processes and therefore still contains residual catalyst. Filaments or strands which have been made by foaming this type of plastic material surprisingly have no tendency to turn yellow and retain their brilliant white color even when exposed to intense light without addition of white pigments.

The composition of the products can be varied within the above-stated limits. Particularly the fine cell structure of the foam and the mechanical, thermal or electrical properties of a monofilament depend on the composition of the material and can easily be ascertained by conventional tests so as to determine the optimum mixture for a particular purpose. It has been found, for instance, that the cell size of the foam is as much smaller as the solubility of the foaming agent is lower in the high molecular portion of the stereoregular propylene polymerizate. With the very high molecular polypropylene which has no affinity for the solvent, the addition of solution promoters—these are the low molecular fractions—accomplishes that the incorporation of the solvent particles is possible in the insoluble particles through the solution promoter. It can be assumed that high molecular stereoregular propylene polymerizates can be foamed for the purposes of the invention in all cases where the low molecular fractions included therein do not only have an affinity for the solvent but, on the basis of their unlimited mixing properties with the solution-phobic high molecular fraction, act so to speak as transmitters of the foaming agent for the entire mass.

The processing of the propylene polymerizate by means of hydrocarbons having from 5 to 10 carbon atoms such as pentane, etc., or a gasoline fraction having a boiling point range between about 60 and 95° C. can be effected in conventional manner by means of an extruder screw. Conventional cross-linking agents such as peroxides or the like may be added to the plastic prior to foaming and may be distributed therein to form a homogeneous mass. Preferably, the cross-linking agents are employed in amounts between about 0.2 and 5% by weight relative to the total weight of the plastic composition. It is also possible to make use of a radiation treatment that has cross-linking effects. In this manner, the properties of the final filament or strand can be varied considerably.

The initial mixture may also be modified by employing conventional additives such as nucleating agents for the bubble formation, stabilizers, fillers, flame-retarding agents, anti-static agents, bactericides, fungicides, etc. It has also been found useful to employ anti-oxidants since polypropylene and the polymerizates containing the same are highly sensitive to autoxidation and far more so as for instance polyethylene.

Particularly useful is an extruder screw press wherein the screw includes a zone or partial length for merely passing on the pulverulent foamable mixture without increasing its density. Following this portion, there is a short compression zone which preferably provides a compression ratio of about 1:3. The last zone of the screw which connects with the short compression zone is a metering zone and this last zone should preferably have a length of between 3 and 15 D (screw diameters).

The shape of the filamentary or stranded product is largely determined by the geometry of the extruder machine. For instance, a monofilament which may have a round, flat or hollow profile can be formed by means of apertured or slotted nozzles which, if desired, may have a specific profile. For instance, a ribbon-shaped profile with three longitudinal grooves can be formed by means of a nozzle which has three outlets in close proximity to each other. When the jelled mass protrudes from the machine, the individual strands, upon subsequent expansion, will fuse together at their lines of contact. Thus, a profiled ribbon may be obtained that has two notches only.

It is also possible by means of the extruder operation to obtain a monofilament with a kind of marbled surface by using differently colored and intermixed polymerizates. The temperature in this case may be adjusted to permit the gel to leave the machine with a slight break in the melting process, that is to leave the nozzle in a slightly pulsating manner. The surface of the monofilament after cooling down will then have a marbled surface.

Contrary to the process of the above-mentioned French patent, the monofilaments leaving the nozzle can immediately be stretched without prior passing through a heating channel. The optimum stretchig ratio is in the range between about 1:2 and 1:16.

Very fine structure monofilaments can also be formed by first making a foamed foil by means of the extrusion nozzle and then cutting up this foil into strips. These foils can then be passed in conventional manner through a heating channel and be subjected to stretching.

The following examples will further illustrate the invention.

EXAMPLE 1

A foamable mass was formed consisting of 87.7% by weight of propylene polymerizate (as defined in detail further below), 4.0% by weight of a silica gel ("Mikrosil") as nucleting agent, 0.3% by weight of barium stearate and 8.0% by weight of gasoline (60/95). The polypropylene had been formed in the gas phase. The pulverulent components were then intimately mixed in a Loedige mixer and the foaming agent was then applied to the powdered mixture by spraying. This powder mixture and foaming agent were then fed continuously into the extruder.

The pulverulent propylene polymerizate had a melting range of 157–162° C. (penetrometer DIN 53445); its melt index MFJ 190/20 was about 2 g./10 min. (DIN 53735 (E)). Its density was 0.896 g./cm.$^3$ and the reduced specific viscosity determined in dekalin (with 0.2% N-phenyl-$\beta$-naphthylamine stabilized with capillary No. I, K=0.00999) at 135° C., concentration 0.1% was at $\eta$ red.=9.8. The isotactic index was at about 10.

The propylene polymerizate contained 10% by weight of a heptane-soluble low molecular propylene polymerizate with atactic and isotactic fractions. This low molecular weight polymerizate had a mean molecular weight between 10,000 and about 100,000. The propylene polymerizate furthermore contained about 20% by weight of polymers with a mean molecular weight below 230,000, about 40% by weight of polymers with a mean molecular weight between 230,000 and 1,150,000 and about 40% by weight of polymers with a mean molecular weight above 1,150,000. This last fraction contained 5% by weight of polymers with a mean molecular weight above 3,000,000. The molecular weight distribution ($\overline{M}w/\overline{M}n$-1 was about 8.2.

The polymerizate had the following structural parameters (prior to foaming):

(a) Numerical mean of the molecular weight: $\overline{M}n$ calculated as 125,000.

(b) Weight mean of the molecular weight: $\overline{M}w$ calculated as 1,151,000.

The diameter of the extruder screw was D=22 mm., its length was 30 D. The screw was a pure conveyor screw with a short conveyor zone. The length of the metering zone was 10 D. The nozzle had a round nozzle with a nozzle diameter of 2.5 mm. The cylinder had four heating or cooling zones in addition to the water-cooled inlet zone. The temperature of the zones was adjusted as follows: Zone I (water cooling zone) about 20° C.; Zone II 100° C.; Zone III 170° C.; Zone IV 175° C.; nozzle 170° C. The extrusion was effected at 1 kg./h.

There were thus obtained superfine cell structure, supple round strands of, about 4 mm. with a silky, dull surface of white color. The round strand was immediately stretched in the same operation without reheating, that is without further supply of heat. The stretching was effected at different ratios lying between 1:2 and 1:18. The round profiles stretched at a ratio of 1:2 had a weight per liter of 380 g. and had a high tear strength. The mean molecular weight was 840,000.

The round profile filaments were highly suitable for weaving, knitting, braiding or interlacing. The same was true of ribbon profiles obtained in the same manner. The profiles which were used for interlacing were only half as heavy as the natural products used for this purpose and only one-third to one-fourth as heavy as PVC profiles used in this connection.

EXAMPLE 2

This example will illustrate by way of a comparison the superiority of the process described in Example 1.

The pulverulent propylene polymerizate of the same type as used in Example 1 was fed to an extruder and through an apertured nozzle without conventional additives and also at first without a foaming agent. The cylinder temperature was between 210 and 260° C. The granulate thus obtained had a reduced specific viscosity of $\eta$ red.=4.24, a mean molecular weight of 504,000 and a molecular weight distribution of 4.46. The low molecular fraction which was soluble in heptane and atactic and isotactic was above 10%.

The granulate was ground while being cooled and there were then mixed with it as in Example 1 4.0% by weight of silica gel ("Mikrosil") as nucleating agent, 0.3% by weight of barium stearate, 8.0% by weight of gasoline (60/95) and the mixture was then extruded. There was obtained a compact rigid strand or rod which was interspersed with a few bubbles. Its weight per liter was 820 g.

Apparently, because of the comparatively high temperature of the granulating operation, the propylene polymerizate which initially had a high molecular weight (above 1,000,000) had been subjected to strong thermal degradation down into the range of conventional polypropylenes such as are made with the Ziegler-Natta-catalysts or in the liquid phase by the Philipps petroleum process. The degraded granulated product could be foamed only in conventional manner, for instance using azodicarbonamide as gas generating agent. However, even with this process, there were obtained only comparatively coarse pore products which, above all, were very stiff and could not be compared with the products of Example 1.

EXAMPLE 3

This is a further comparison showing the results with a conventional polypropylene. In this case, the initial mass was a commercial stereoregular polypropylene having a mean molecular weight of 400,000 and a reduced specific viscosity of $\eta$ red.=3.7 (determined in dekalin, stabilized with 0.2 wt.-percent N-phenyl-$\beta$-naphthylamine as 0.1% solution at 135° C.). This composition was mixed as in Example 1 with "Mikrosil," barium stearate and gasoline (60/95) and then extruded.

There was thus obtained a compact, round rod which included only a few coarse bubbles. The weight per liter of the material was 811 g., the mean molecular weight was 350,000.

As appears, the conventional polypropylene could not be foamed to form the products of the invention. By foaming with azodicarbonamide, there was obtained a foamed material which, however, had inferior properties compared with the filamentary products of the invention and, in that respect, was similar to the products of Example 2.

EXAMPLE 4

The same mixture was foamed as in Example 1, but there were added 10% by weight of a polyethylene powder ("Lupolen 1800 S") which had a density of 0.916–0.918 and a melt index of $(MI_2)=17$–22 g./10 min. This material was subjected to extrusion as in Example 1.

There was obtained a profiled rod with a fine cell structure and great flexibility. The polyethylene addition improved the flow properties of the foamed mixture. The weight per liter of the unstretched profile was 290 g.

EXAMPLE 5

A mixture was again used of the same type as in Example 1. However, there were added 20% by weight of poly-α-butylene ("Vestolen" Bt 1711) powder (viscosity $\eta$ red., c.=0.1 in dekalin at 135° C.=4.0; melt viscosity at 5.0 kp. load was 0.5 g./10 min., according to DIN 53735).

This mass was then extruded as in Example 1.

There was obtained a profiled rod with very fine structure cells which was flexible but slightly tougher than the produtc obtained in Example 1. The weight per liter of the product was 300 g.

We claim:

1. A filamentary polyolefin foam product comprising a stereoregular propylene polymerizate having an average molecular weight between 700,000 to 1,200,000 $\eta$ red. being about 5–10 and containing about 10 to 15% of a heptane-soluble propylene polymerizate of an average molecular weight between 10,000 and 100,000.

2. The filamentary product of claim 1 which is in the form of a ribbon or strand.

3. The filamentary product of claim 1, wherein at least part of the propylene polymerizate is a gas-phase polymerized polymerizate.

4. The filamentary product of claim 3, which still contains residual catalyst from the gas-phase polymerization.

5. The filamentary product of claim 1, which in unfoamed condition has the following structure parameters:
   (a) numerical mean of the molecular weight $\overline{M}n$ calculated as 125,000
   (b) weight mean of the molecular weight $\overline{M}w$ calculated as 1,151,000
   (c) molecular weight distribution $(\overline{M}w/\overline{M}n-1)=8.2$ and density 0.90.

6. The filamentary product of claim 1, wherein the high molecular weight stereoregular polymerizate comprises (a) from about 10 to 30% by weight of polymers with a mean molecular weight of below 230,000, (b) about 30 to 50% by weight of polymers with a mean molecular weight between about 230,000 and 1,150,000 and (c) about 30 to 50% by weight of polymers with a mean molecular weight above 1,150,000, the last fraction including about 5% by weight of polymers with molecular weights above 3,000,000.

7. The filamentary product of claim 6, wherein the polymers with a mean molecular weight below 230,000 are present in an amount of about 20%, the polymers with a molecular weight between about 230,000 and 1,150,000 are present in an amount of about 40% and the polymers with a mean molecular weight above 1,150,000 are present in an amount of about 40% by weight.

8. The filamentary product of claim 1, wherein the high molecular stereoregular propylene polymerizate is an isotactic homopolymerizate.

9. The filamentary product of claim 1, wherein the high molecular weight stereoregular propylene polymerizate is an isotactic co-polymerizate or graft polymerizate or mixture of these two types of polymers between polymers of propylene and polymers of another olefin or a propylene-compatible vinyl compound.

10. The filamentary product of claim 1, wherein the high molecular stereoregular propylene polymerizate includes mechanical mixtures of propylene polymers and other olefinic polymers or propylene-compatible vinyl polymers and wherein the mixture includes at least 10% by weight of a low molecular heptane-soluble propylene polymerizate.

11. The filamentary product of claim 1, wherein the propylene polymerizate contains a minor proportion of an ethylene or styrene polymer.

12. The filamentary product of claim 1, wherein the propylene polymerizate contains a cross-linking agent.

13. The filamentary product of claim 1, wherein the propylene polymerizate contains a bactericide.

14. The filamentary product of claim 1, wherein the propylene polymerizate contains a fungicide.

15. The filamentary product of claim 1, wherein the propylene polymerizate contains a flame-retarding agent.

16. The process of making the filamentary product of claim 1, comprising the steps of mixing (a) a propylene polymerizate having a molecular weight above 600,000 and containing 10–15% of a heptane-soluble relatively low molecular weight polypropylene of an average molecular weight between 10,000 and 100,000 and (b) a solvent type liquid hydrocarbon blowing agent having 5 to 10 carbon atoms and then extruding and foaming the mixture at a temperature between 170 and 220° C. followed by subjecting the extruded body of stretching without intermediate heat application or compression.

17. The process for making a filamentary product of claim 16, wherein the stretching is effected at a ratio between 1:2 and 1:18.

18. The process for making a filamentary product of claim 16, wherein the stretching is effected at a ratio up to about 1:16.

References Cited

UNITED STATES PATENTS 3,250,731  5/1966  Buhl et al. _____ 260—2.5 E
3,377,415  4/1968  Oppenlander _____ 264—210 F MURRAY TILLMAN, Primary Examiner W. J. BRIGGS, Sr., Assistant Examiner U.S. Cl. X.R.

260—2.5 R, 897 A; 264—53, 210 F